UNITED STATES PATENT OFFICE.

ROY CROSS, OF KANSAS CITY, MISSOURI, ASSIGNOR TO F. H. THWING, OF KANSAS CITY, MISSOURI.

PROCESS FOR TREATING ALUNITE.

1,301,394.   Specification of Letters Patent.   Patented Apr. 22, 1919.

No Drawing.   Application filed February 23, 1918.   Serial No. 218,631.

*To all whom it may concern:*

Be it known that I, ROY CROSS, of the city of Kansas City, in the State of Missouri, have invented certain new and useful improvements in processes of treating alunite for the purpose of recovering therefrom potash (that is, various compounds of potassium) in easily-soluble form and aluminum compounds in a form adaptable for the production of sodium aluminate or metallic aluminum.

This invention relates to a process of treating alunite and other water insoluble materials of like nature which are capable of yielding alumina and potash and containing sulfates to recover the potash in easily soluble form and to recover alumina in a form susceptible of easy conversion into sodium aluminate or of utilization for the manufacture of aluminum.

Alunite is a native mineral of the general composition of a hydrated sulfate of aluminum and potassium and is given the formula $K_2O.3Al_2O_3.4SO_3.6H_2O$. It is insoluble or only partly soluble in water. The usual process of converting it into utilizable forms consists in calcining the material at a temperature capable of dissociating aluminum sulfates while not decomposing potassium sulfate. Usually calcination is effected at about 800° C. After calcination the contained potash should all be in the form of easily soluble potassium sulfate and the material should contain insoluble aluminum oxid or alumina as such, that is as $Al_2O_3$, so that simple leaching should effect a clean separation. In calcination the sulfur corresponding to aluminum sulfates is expelled in the form of sulfur oxids and acids. This method however, as just outlined, or in various proposed modifications, is not entirely satisfactory in practice because of the difficulty of obtaining calcined products in which the potash is all in soluble form. The alumina, also, is left in a calcined, little reactive form. It is difficult to produce alumina in a form readily giving sodium aluminate of high purity, or capable of easy purification.

It is the purpose of the present invention to provide a method treating alunite, and similar insoluble natural materials containing alumina and sulfuric acid, taking advantage of the fact that conversion and solubilization of the material will take place more readily and at a lower temperature if the alunite be mixed with salt prior to calcination and particularly if calcination be effected in an atmosphere containing superheated steam. On calcining a mixture of alunite and salt (NaCl), instead of the alumina sulfate component breaking up with formation of alumina and volatile oxids and acids of sulfur, the result is the formation of hydrochloric acid (HCl), which escapes as gas, sodium sulfate, potassium sulfate and alumina. The action is much facilitated by the presence of steam. Because of the nature of the action and the comparatively low temperatures which are possible, the alumina is left in a reactive form and is pure, rendering it suitable for the manufacture of aluminum or of sodium aluminate. The potash is contained in the form of readily soluble potassium sulfate. By leaching the residue left after this treatment, a clean extraction of potash is possible. The alumina left after leaching is pure and reactive. It may be used as such or it may be converted into sodium aluminate by mixing with sodium sulfate and heating to a high temperature. This results in the formation of the aluminate and expulsion of $SO_3$ as acids and oxids of sulfur. The action is much facilitated by mixing with a suitable reducing agent, such as carbon, capable of reducing sulfur trioxid, sulfur dioxid, etc.

In calcining a mixture of salt and alunite I may use a temperature of 500 to 700° C.; the reaction going on completely and readily within this range of temperatures. The temperature of reaction is much lower than that required for decomposition of the mineral by the use of heat alone; that is, without the addition of sodium chlorid or salt. In the presence of steam the action goes on at a still lower temperature; the greater the amount of steam, in a general way, the lower the temperature of reaction. The temperatures required in the manufacture of alkali aluminate from the alumina and alkali sulfate are higher. The best temperature is around 1200° C., although temperatures as high as 1500° C. may be used. A temperature of approximately 1250° C. does very well. Calcination is continued until the material is substantially free of sulfates. Lower temperatures are possible in this reaction if the mixture of sodium sulfate and alumina contains carbon.

In the method as just described a mixture of salt and alunite is calcined in the presence of steam at a relatively low temperature, producing HCl, which escapes as a gas, and a mixture of alumina with sodium and potassium sulfates. Calcination is continued until the mixture is substantially free of chlorid. The residue is then leached to recover sodium and potassium sulfates and the alumina is mixed with sodium sulfate and also usually with carbon and calcined at a higher temperature to make sodium aluminate. Instead of using two calcination steps with an intermediate leaching, the operation may be continuous, the sodium and potassium sulfates formed in the first calcination being utilized in the second. In this method of operation the alunite is mixed with the chemically equivalent amount of salt and some carbon and calcined as before with steam at a relatively low temperature until the mixture is free of chlorids. Instead of then cooling and leaching, the mixture is next brought to a higher temperature by a second calcination, with the result of forming alkaline aluminates directly.

Any method of applying heat may be used in the operations stated. It is advantageous to use indirect heating. Electric heating is particularly suitable.

What I claim is:—

1. The process of utilizing alunite which comprises mixing such alunite with salt and calcining in the presence of steam.

2. The process of utilizing alunite which comprises calcining a mixture of alunite and salt in the presence of steam to form alkali sulfates and alumina of reactive nature and recalcining said alumina in admixture with alkali sulfates at a higher temperature.

3. The process of utilizing alunite which comprises calcining a mixture of alunite and salt in the presence of steam to form alkali sulfates and alumina of reactive nature and recalcining said alumina in admixture with alkali sulfates and carbon at a higher temperature.

4. The process of utilizing alunite which comprises calcining a mixture of alunite, salt and carbon in the presence of steam and at a relatively low temperature until the mixture is free of chlorids and then calcining at a higher temperature until the mixture is free of sulfates.

ROY CROSS.

Witnesses:
 GERTRUDE CLINGENPEEL,
 LEE E. CLARK.